United States Patent [19]  [11] 4,426,479
Deguchi et al.  [45] Jan. 17, 1984

[54] POLY-P-PHENYLENE SULFIDE RESIN COMPOSITION AND FILM MADE THEREOF

[75] Inventors: Yukichi Deguchi; Shinichiro Miyaji; Hiroaki Kobayashi, all of Ohtsu, Japan

[73] Assignee: Toray Industries, Inc., Tokyo, Japan

[21] Appl. No.: 386,218

[22] Filed: Jun. 8, 1982

[30] Foreign Application Priority Data

Jun. 12, 1981 [JP] Japan ................................. 56-89660

[51] Int. Cl.$^3$ ................................................. C08K 3/18
[52] U.S. Cl. ................................... 524/430; 428/419; 524/432
[58] Field of Search ................. 524/430, 432; 428/419

[56] References Cited

U.S. PATENT DOCUMENTS

| | | | |
|---|---|---|---|
| 3,451,873 | 6/1969 | Harrison et al. | 156/325 |
| 3,725,362 | 4/1973 | Walker | 528/388 |
| 4,012,539 | 3/1977 | Davies | 524/430 |
| 4,036,822 | 7/1977 | Patel et al. | 528/388 |
| 4,140,671 | 2/1979 | Cohen | 260/40 R |
| 4,178,276 | 12/1979 | Shue et al. | 525/4 |
| 4,286,018 | 8/1981 | Asakura et al. | 528/373 |
| 4,355,059 | 10/1982 | Blackwell | 428/419 |

FOREIGN PATENT DOCUMENTS

1056226 1/1967 United Kingdom .

*Primary Examiner*—Melvyn L. Marquis
*Attorney, Agent, or Firm*—Armstrong, Nikaido, Marmelstein & Kubovcik

[57] ABSTRACT

A poly-p-phenylene sulfide resin composition comprising poly-p-phenylene sulfide as a principal component and 0.05 to 40 wt % (based on the total weight of the composition) of at least one metal component selected from the group consisting of zinc, lead, magnesium, manganese, barium and tin. The plastic materials prepared from the composition of this invention are greatly improved in resistance to copper contact and thermal resistance in closed air environment, and therefore are very useful for electrical insulation.

3 Claims, No Drawings

POLY-P-PHENYLENE SULFIDE RESIN COMPOSITION AND FILM MADE THEREOF

BACKGROUND OF THE INVENTION

The present invention relates to a poly-p-phenylene sulfide resin composition and a film made thereof. More particularly, it relates to a chemically stabilized poly-p-phenylene sulfide resin composition and a film made thereof.

Poly-p-phenylene sulfide is a thermoplastic crystalline engineering plastic which is superior in thermal resistance, electrical insulating properties, chemical resistance, and flame retardancy. It is useful as a raw material for injection molding as well as films and fibers. Molded materials, films, and fibers produced therefrom are suitable as heatproof electrical insulating materials because of their long-term thermal resistance (continuous use at 160° to 200° C.).

However, the use of poly-p-phenylene sulfide as an electrical insulating material has been limited due to the following disadvantages.

First, the conventional poly-p-phenylene sulfide insulating material is subject to so-called "copper contact failure" which is a phenomenon that the insulating material considerably decreases in thermal resistance when it is exposed to a high temperature continuously while in direct contact with copper, as in the case where an insulating film is wound directly around a copper wire.

Secondly, the conventional poly-p-phenylene sulfide insulating material decreases considerably in thermal resistance when it is exposed to a high temperature continuously in the presence of oxygen in an enclosed environment, as in the case where the insulating material is used in an enclosed motor. This phenomenon is less severe when it is used in an open motor.

Thirdly, the conventional poly-p-phenylene sulfide resin composition shortens the life of a mold due to gradual corrosion of the part of the mold in contact with the polymer during injection molding even in applications other than electrical insulation.

The above disadvantages are also found in the biaxially oriented poly-p-phenylene sulfide film for electrical insulation as disclosed in U.S. Pat. No. 4,286,018. This patent discloses that the biaxially oriented poly-p-phenylene sulfide film can contain an additive and/or filler, but this disclosure merely suggests the possibility for incorporating an additive and/or filler and the incorporation of an additive and/or filler is not intended to eliminate the above-mentioned disadvantages. This patent mentions nothing about the improvement in resistance to copper contact and thermal resistance in closed systems which is accomplished by the use of specific additives or fillers described hereinafter.

There is disclosed in U.S. Pat. No. 4,140,671 the addition of a metal oxide such as ZnO and MgO to a polyethylene terephthalate resin composition containing polyphenylene sulfide. According to the disclosure, the metal oxide additive is incorporated merely as a nucleating agent for the polyethylene terephthalate mainly constituting the composition and the presence of the polyethylene terephthalate as a main ingredient is a requisite of this invention. What is disclosed in this patent is not associated with the improvement in the disadvantages of poly-p-phenylene sulfide resin compositions described heretofore. This is apparent from the well known fact that a thermoplastic polyethylene terephthalate resin composition as disclosed in this patent is so poor in thermal resistance it is unable to use for a long time under a high temperature condition where copper contact failure becomes a problem.

SUMMARY OF THE INVENTION

It is an object of the present invention to provide a poly-p-phenylene sulfide resin composition which is free of the above-mentioned disadvantages, superior in resistance to copper contact and thermal resistance in closed systems, and non-corrosive to dies and molds.

It is another object of the present invention to provide biaxially oriented poly-p-phenylene sulfide film which is improved in resistance to copper contact and thermal resistance in closed systems and is applicable in broad application areas as an electrical insulating material.

It is further another object of the present invention to provide a poly-p-phenylene sulfide resin composition suitable for manufacturing molded materials, fibers, nonwoven fabrics, and paper of poly-p-phenylene sulfide which are improved in resistance to copper contact and thermal resistance in closed systems.

The present invention in gist relates to a poly-p-phenylene sulfide resin composition and a biaxially oriented film made thereof, said composition comprising poly-p-phenylene sulfide as a principal component and 0.05 to 40 wt % (based on the total weight of the composition) of at least one metal component selected from the group consisting of zinc, lead, magnesium, manganese, barium, and tin.

DESCRIPTION OF THE PREFERRED EMBODIMENTS

The poly-p-phenylene sulfide (abbreviated as PPS hereinafter) as the major component of the composition of this invention should be composed of at least 90 mol %, preferably at least 95 mol %, of the recurring units represented by the structural formula

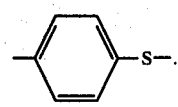

If the content of the p-phenylene sulfide units is less than 90 mol %, preferably less than 95 mol %, the resulting polymer is not sufficient in crystallinity and low in thermal deformation temperature and it is difficult to prepare superior plastic materials from such a polymer (the term "plastic materials" comprehends any product in the form of lump, sheet, and fiber made by utilizing the thermoplasticity of PPS).

The remainder, which is less than 10 mol %, preferably less than 5 mol %, of the recurring units of the polymer may contain meta units,

ether units

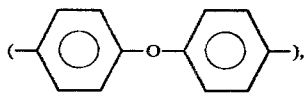

sulfone units

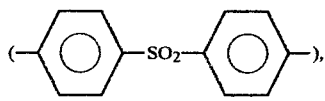

biphenyl units

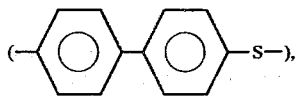

naphthyl units

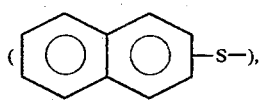

and substituted phenyl sulfide units

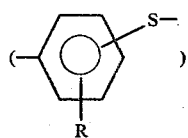

(where R is an alkyl group having 1 to 10 carbon atoms, nitro group, phenyl group, or alkoxyl group having 1 to 10 carbon atoms), or trifunctional phenyl sulfide units

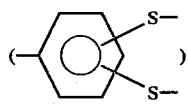

in an amount not greatly affecting the crystallinity, stretchability, sensitivity to thermal degradation, and processability of the resulting polymer. It is specially preferable that these comonomer units is less than 5 mol % of the total recurring units.

The polymer should have an apparent melt viscosity of 50 to 100,000 poise, preferably 70 to 50,000 poise, as measured at a temperature of 300° C. and under an apparent shear rate of 200 sec$^{-1}$ from the standpoint of processability.

The apparent melt viscosity is not directly related with the melt flow index (MFI) which is generally used as an index for melt viscosity, but the PPS composition of this invention has an MFI in the range of 3 to 6000.

The degree of polymerization of PPS is difficult to determine accurately because PPS does not dissolve at all in an usual organic solvent and it varies greatly depending on the composition of comonomers and the degree of crosslinking. It is approximately 10 to 1000.

The PPS resin composition of this invention should contain at least one metal component selected from the group consisting of zinc, lead, magnesium, manganese, barium, and tin, in a total amount of from 0.05 to 40 wt %, preferably from 0.1 to 35 wt %, still preferably from 0.5 to 20 wt %, based on the total weight of the composition. These metal component may be contained in any form, e.g., in the form of oxides such as zinc oxide and lead oxide; organic or inorganic acid salts such as zinc acetate and zinc sulfate; metal simple substances; or mixtures thereof. Metal simple substances and electrically conductive compounds contained in high concentrations may decrease the electrical insulating properties of the composition. When the above-mentioned elements are contained in the form of their compounds, their contents in terms of element should be within the above-mentioned range.

If the content is less than 0.05 wt %, the resulting composition is not sufficiently improved in resistance to copper contact, thermal resistance in closed systems, and elimination of mold corrosion, which are the objects of the present invention. On the other hand, if it exceeds 40 wt %, the resulting composition is poor in mechanical properties.

The above-mentioned metal component should preferably be contained in the form of oxides if the resulting composition is to maintain good electrical insulating properties and thermal stability in processing. Zinc oxide and lead oxide are particularly preferable.

Other components elements than the above-mentioned ones may be contained in an amount that would not hinder the object of the present invention.

The composition of this invention may contain additives such as antioxidant, thermostabilizer, lubricant, nucleation agent, UV absorber, and coloring agent in ordinary quantities. In addition, the composition of this invention may be blended with other polymers and fillers in an amount that would not hinder the object of the present invention in order to improve the fluidity, crystallinity, thermal resistance, and mechanical properties. If a polymer like polyethylene terephthalate which is poor in thermal resistance is to be incorporated, the quantity should be less than 10% to maintain the thermal resistance of the composition.

It goes without saying that if such additives, polymers, and fillers to be incorporated contain the above-mentioned metal components, which are the essential components of the composition of this invention, care must be taken that the total quantity of these components should be in the above-mentioned range (0.05 to 40 wt %).

In the case where the above-mentioned metal components, which are the essential components of the composition of this invention, are dispersed in the composition in the form of fine particles of simple substances, compounds, or mixtures thereof, particles smaller than 1 μm in particle diameter should account for at least 10% by number of the total particles.

The term "sheetlike material" as used in this specification means flat plastic materials thinner than about 5 mm and denotes generally plastic materials called film, sheet, or plate.

The resin composition of this invention exhibits its improved resistance to copper contact and thermal resistance in closed systems when formed into sheetlike materials (particularly biaxially oriented film).

The biaxially oriented film of poly-p-phenylene sulfide of this invention should preferably contain the above-mentioned metal components in an amount of 0.1 to 35 wt %, preferably 0.5 to 20 wt %, based on the weight of the film.

The PPS constituting the biaxially oriented film should preferably have a melt viscosity of 500 to 30,000 poise when measured at a temperature of 300° C. and a shear rate of 200 sec$^{-1}$.

The biaxially oriented film is not specifically limited with respect to the degree of orientation, but the degree of orientation should preferably be such that the tensile strength in the longitudinal and transverse directions is at least 13 kg/mm$^2$. Usually, the tensile strength does not exceed 30 kg/mm$^2$.

Biaxially oriented films manufactured from a polymer containing a metal oxide are usually poorer in mechanical properties, particularly elongation, than those manufactured from a polymer containing no metal oxides. It is to be noted that such deterioration of mechanical properties does not occur in the biaxially oriented film of poly-p-phenylene sulfide containing zinc oxide and lead oxide according to this invention. This suggests that zinc oxide and lead oxide are particularly effective as the compounds containing the above-mentioned components.

It is not elucidated yet why the PPS resin composition and PPS sheetlike material of this invention containing specific metal components are superior in resistance to copper contact, thermal resistance in closed systems, and extending of the life of molds. It is presumed that these specific metal components prevent a very small quantity of decomposition products released from PPS resin at high temperatures.

The resin composition of this invention is produced in the following manner.

PPS, which is the base polymer of the composition of this invention, is prepared by reacting an alkali metal sulfide and p-dihalogenobenzene in a polar organic solvent under high temperature and high pressure. Preferably, it is prepared by reacting sodium sulfide and p-dichlorobenzene in N-methylpyrrolidone or other high-boiling point amide polar solvents. This process is well known, and the above process is not limitative.

If films, fibers, and high impact molded materials are to be made from PPS, the reaction at 230° to 280° C. in the presence of polymerization modifiers such as caustic alkali and alkali metal carboxylates is preferable.

The polymerization pressure and polymerization time should be determined properly according to the degree of polymerization desired and the type and quantity of modifiers used.

The PPS thus prepared is incorporated with at least one metal components selected from the group consisting of zinc, lead, magnesium, manganese, barium and tin, in the form of simple substance or compound or mixture thereof, which are the essential components of the composition of this invention. They may be incorporated in any manner and, typically, in the following two manners. First, fine powder composed of the above-mentioned simple substances, compounds, or mixture thereof is added to the polymerized PPS resin before or after it is washed with water to remove solvent, residual salts, and polymerization modifiers, or after drying that follows such washing. Secondly, the washing is performed with water containing the ions of the above-mentioned elements. The latter is applicable if the compounds containing the essential elements are soluble in water.

The preferable composition of this invention that contains the essential elements in the form of oxides may be prepared by adding the oxides of desired elements in the form of fine powder to PPS before or after it is washed with water of after drying that follows such washing. It is preferable from the standpoint of workability to mix using a mixer such fine powder with PPS which has been dried.

The powdery composition thus prepared is melted and extruded into gut using an extruder and the gut is cooled and cut into pellets. (This step is called "pelletization" hereinafter.) Prior to pelletization, the composition may be mixed with fillers, additives, or polymers according to the intended object of use.

The composition in the form of powder or pellets thus prepared should contain the essential elements in an amount of from 0.05 to 40 wt %. If the content is less than 0.05 wt %, the composition is not sufficiently improved in "resistance to copper contact" and "thermal resistance in closed system" which are the objects of this invention. If the content exceeds 40 wt %, the resulting composition is poor in mechanical strength.

The PPS sheetlike material of this invention is usually prepared by supplying the resin composition prepared as above to an extruder or other apparatus for melt extrusion, melting it at 290° to 360° C., extruding the melt from a slit die, and quenching the extrudate by, for example, casting it around a rotating drum. The PPS sheetlike material thus prepared may further undergo heat treatment for crystallization so that the thermal resistance and mechanical properties are improved as required.

The biaxially oriented film, which is the most desirable form of this invention, is prepared by stretching the substantially amorphous unstretched sheet 2.0 to 4.5 times in the longitudinal and transverse directions at 85° to 105° C. Stretching may be accomplished by successive biaxial stretching by rolls and a tenter, simultaneous biaxial stretching by a tenter, tube stretching, and other methods. The successive biaxial stretching by rolls and a tenter is most favorable in the production efficiency and quality.

The resin composition of this invention having the above-mentioned constitution is extremely improved in "resistance to copper contact", "thermal resistance in closed system", and "corrosion of mold" in injection molding as compared with conventional poly-p-phenylene sulfide resin compositions. The "plastic materials" prepared from the PPS resin composition can be used in any application areas because of the extremely high reliability.

It is surprising to note that the resin composition of this invention is much superior in thermal resistance in ordinary open systems to conventional poly-p-phenylene sulfide resin compositions and the "plastic materials" prepared from the resin composition of this invention can be used continuously at higher temperatures than those from conventional PPS resin compositions.

The sheetlike materials of this invention is extremely improved in "resistance to copper contact" and "thermal resistance in closed systems", without degrading the superior characteristic properties of the conventional poly-p-phenylene sulfide sheetlike materials. The PPS sheetlike materials are extremely reliable and can meet any use conditions.

The biaxially oriented films of this invention are particularly superior in these properties and are useful for wire covering and other electrical insulating applications.

In this specification, the property values of the resin compositions and plastic materials prepared therefrom were defined, measured, and evaluated as follows:

(1) Measuring method of quantity of metal components in composition

The essential metal components in the composition were determined by ashing a sample of the composition using a low-temperature plasma asher, dissolving the ash in acids, converting the solutions into aqueous solutions of nitrates, and finally subjecting the aqueous solutions to ICPES (inductively coupled plasma emission spectrometry).

(2) Apparent melt viscosity

The shear stress $\tau$, the apparent shear rate $\dot{\gamma}$, and the apparent viscosity $\mu$ are defined as follows:

$$\tau = (RP)/(2L)$$

$$\dot{\gamma} = (4Q)/(\pi R^2)$$

$$\mu = \tau/\dot{\gamma}$$

when the molten polymer is extruded using an extrusion plastometer having a capillary tube, L in length and R in radius, at a temperature T, under a pressure of P, and with a throughput of Q. The index of the melt viscosity of the polymer is given by the value $\mu_o$ at $\dot{\gamma} = 200$ sec$^{-1}$ on the curve $\mu = f(\dot{\gamma})$ obtained by plotting $\mu$ against $\dot{\gamma}$. In this invention, measurements were made using a die having L=10 mm and R=0.5 mm at T=300° C.

(3) Glass transition temperature ($T_g$) are melting point ($T_m$) of polymer

They were measured according to DSC method. $T_m$ was defined by the peak temperature of the melting curve.

(4) Tensile strength and ultimate elongation

They were measured according to JIS Z-1702 using an "Instron" type tensile tester.

(5) Thermal resistance and resistance to copper contact

The resin composition is formed into a film, about 50 μm in thickness, and the film is heat-treated at 230° C. for 1 min. This test piece is measured for the initial values of tensile strength and ultimate elongation according to the above-mentioned methods.

A. Thermal resistance in open systems

The test specimen is placed in a hot-air oven at 220° C. for 96 h or 240 h, and the aged test specimen is measured for tensile strength and ultimate elongation. The thermal resistance in open systems is indicated by the percentage of the measured value to the initial value.

B. Thermal resistance in closed systems

The test specimen (about 100 cm$^2$) is placed in a glass test tube, about 50 cm$^3$ in volume, and the opening of the test tube is melted and closed after reducing pressure to 360 mmHg. The test tube containing the test specimen is placed in a hot-air oven at 220° C. for 96 h or 240 h, and the aged test specimen is measured for tensile strength and ultimate elongation. The thermal resistance in closed systems is indicated by the percentage or the measured value to the initial value.

C. Resistance to copper contact

The test specimen held between two copper plates is placed in a hot-air oven at 220° C. for 96 h or 240 h. The aged specimen is measured for tensile strength and ultimate elongation. The resistance to copper contact is indicated by the percentage of the measured value to the initial value.

The present invention is described in detail with reference to the following example.

EXAMPLE 1

(1) Polymerization of PPS

Into an autoclave were changed 32.6 kg of sodium sulfide (250 mol, containing 40 wt % of water of crystallization), 100 g of sodium hydroxide, 18.0 kg of sodium benzoate (125 mol), and 79.2 kg of N-methyl-2-pyrrolidone (abbreviated as NMP hereinafter). The reactants were heated up to 205° C. slowly with agitation, and 7.0 liters of distillate containing 6.9 kg of water was removed. To the remaining mixture were added 37.5 kg (255 mol) of 1,4-dichlorobenzene (abbreviated as DCB hereinafter) and 20.0 kg of NMP. The reactants were reacted at 250° C. for 3 h. The reaction product was washed 8 times with deionized water prepared by ion-exchange method and then dried at 100° C. for 24 h using a vacuum, dryer. PPS was obtained in an amount of 23 kg. The PPS was found to have an apparent viscosity of 4000 poise at a shear rate of 200 sec$^{-1}$ at 300° C., a $T_g$ of 90° C., and a $T_m$ of 280° C.

(2) Preparation of composition

The PPS powder prepared in the above step (1) was blended, using a supermixer, with fine metal oxide powder as shown in Table 1 in such an amount that the metal component accounts for 1 wt % of the total weight. Thus ten kinds of compositions (No. 1 to No. 10, including control) were prepared.

(3) Preparation of plastic materials

The composition prepared in the above step (2) was pelletized using a twin-screw extruder, each screw being 30 mm in diameter. The resulting pellets were then melted at 310° C. by a 30-mm single-screw extruder, the melt was extruded from a 200-mm long linear T-die having a 1-mm gapped die lip, and the extrudate was cooled and solidified by casting by an electrostatic pinning method around a metal drum, with the surface kept at 20° C. Thus a sheet, 170 mm in width and 610 μm in thickness, was prepared. This film was biaxially stretched to 3.5 times the original length in both longitudinal and transverse directions simultaneously using a film stretcher (made by T. M. Long Co., Ltd. in U.S.). The stretched film was then heat-treated 230° C. for 1 min. at a constant dimension. Thus film samples (Film No. 1 to No. 10), 50 μm in thickness, were prepared.

The film samples were measured for the content of the metal component according to the above-mentioned method. It was found that the content in the film corresponded to the quantity added to the composition within the range of measurement error.

(4) Evaluation

The results of evaluation of the film samples prepared in the above step (3) are shown in Table 1.

It is to be noted from Table 1 that the films prepared from the compositions of this invention containing specific metal elements are improved in "thermal resistance in closed systems" and "resistance to copper contact" as well as "thermal resistance in open systems".

quantity added to the composition within the range of measurement error.

(4) Evaluation

The results of evaluation of the film samples are shown in Table 2.

TABLE 1

| Film No. | Additives Compound | Content in number (%) of particles not larger than 1 μm in dia. | Tensile strength (kg/mm$^2$) | Initial ultimate elongation (%) | Thermal resistance in open systems* | Thermal resistance in closed systems* | Resistance to copper contact* | Remarks |
|---|---|---|---|---|---|---|---|---|
| 1 | Zinc oxide | 41 | 16.0 | 46 | 75 | 73 | 71 | Example |
| 2 | Lead oxide | 28 | 16.5 | 46 | 74 | 73 | 68 | Example |
| 3 | Magnesium oxide | 17 | 15.8 | 43 | 65 | 52 | 48 | Example |
| 4 | Manganese dioxide | 14 | 15.4 | 41 | 68 | 53 | 46 | Example |
| 5 | Tin dioxide | 21 | 16.7 | 46 | 62 | 50 | 44 | Example |
| 6 | Barium oxide | 82 | 15.6 | 42 | 62 | 49 | 45 | Example |
| 7 | Titanium dioxide | 93 | 14.8 | 36 | 53 | 25 | 18 | Comparative Example |
| 8 | Iron sesquioxide | 96 | 14.9 | 50 | 50 | 21 | 17 | Comparative Example |
| 9 | Antimony sesquioxide | 43 | 14.6 | 43 | 55 | 19 | 15 | Comparative Example |
| 10 | None | — | 15.5 | 45 | 51 | 27 | 21 | Comparative Example |

*Expressed by retention % of elongation after heat treatment at 220° C. for 240 h.

EXAMPLE 2

(1) Polymerization of PPS

Powdery PPS was prepared in the same manner as in step (1) of Example 1.

It is to be noted from Table 2 that the object of this invention is achieved only when the content of the metal component is within the specified range.

TABLE 2

| Film No. | Quantity of zinc oxide added (wt %) | Content of zinc (wt %) | Tensile strength (kg/mm$^2$) | Initial ultimate elongation (%) | Thermal resistance in open systems* | Thermal resistance in closed systems* | Resistance to copper contact* | Remarks |
|---|---|---|---|---|---|---|---|---|
| 11 | 0 | 0 | 15.2 | 46 | 52 | 26 | 20 | Comparative Example |
| 12 | 0.03 | 0.024 | 15.5 | 46 | 56 | 29 | 24 | Comparative Example |
| 13 | 0.2 | 0.16 | 15.7 | 47 | 68 | 66 | 62 | Example |
| 14 | 1.0 | 0.80 | 16.1 | 45 | 70 | 68 | 66 | Example |
| 15 | 5.0 | 4.0 | 15.8 | 47 | 72 | 71 | 67 | Example |
| 16 | 40 | 32 | 15.5 | 42 | 67 | 65 | 61 | Example |
| 17 | 60 | 48 | 10.1 | 14 | 31 | 29 | 25 | Comparative Example** |

*Expressed by retention % of elongation after heat treatment at 220° C. for 240 h.
**Sample film was stretched 2.5 times (instead of 3.5 times) in both directions to prevent breakage.

(2) Preparation of composition

The PPS powder prepared in the above step (1) was blended, using a supermixer, with the zinc oxide used in Example 1 (No. 1 zinc white conforming to JIS prepared by wet process) in varied amounts to prepare seven kinds of compositions containing zinc in different concentrations.

(3) Preparation of plastic materials

The composition prepared in the above step (2) was extruded, cast, stretched, and heat-treated as in step (3) of Example 1 to prepare film samples (Film Nos. 11 to 17) having a thickness of 50 μm.

The film samples were measured for the content of zinc according to the above-mentioned method. If was found that the content in the film corresponded to the

EXAMPLE 3

(1) Polymerization of PPS

Polymerization was carried out as in step (1) of Example 1, except that the resulting polymer was not dried after washing.

(2) Preparation of composition

Two kilograms each of the PPS powder prepared in the above step (1) was dipped in 10 liters of 10% aq. solution of zinc compounds as shown in Table 3. The reaction was performed at 90° C. for 6 h. After that, the powder was washed 8 times with deionized water and dried at 100° C. for 24 h using a vacuum dryer. Thus four kinds of compositions. (Nos. 18 to 21) were prepared.

The compositions were measured for the content of zinc according to the above-mentioned method. It was found that the content (shown in Table 3) in the composition is within the specified range.

(3) Preparation of plastic materials

The composition prepared in the above step (2) was extruded, cast, stretched, and heat-treated as in step (3) of Example 1 to prepare film samples (Film Nos. 18 to 21) having a thickness of 50 μm.

(4) Evaluation

The results of evaluation of the film samples are shown in Table 3.

It is to be noted from Table 3 that the second method of adding metal components is also effective in preparing the product of this invention.

TABLE 3

| Film No. | Zinc compound | Content of zinc (wt %)** | Tensile strength (kg/mm²) | Initial ultimate elongation (%) | Thermal resistance in open systems* | Thermal resistance in closed systems* | Resistance to copper contact* | Remarks |
|---|---|---|---|---|---|---|---|---|
| 18 | Zinc acetate | 0.12 | 15.7 | 43 | 78 | 75 | 75 | Example |
| 19 | Zinc sulfate | 0.11 | 15.5 | 44 | 76 | 74 | 72 | Example |
| 20 | Zinc chloride | 0.09 | 15.5 | 46 | 75 | 73 | 70 | Example |
| 21 | Zinc nitrate | 0.12 | 15.2 | 45 | 79 | 75 | 73 | Example |

*Expressed by retention % of elongation after heat treatment at 220° C. for 240 h.
**Content after water washing and drying.

EXAMPLE 4

(1) Preparation of resin composition

The PPS powder prepared in the above step (1) was incorporated with glass chopped fiber (CS-03-MA411, a product of Asahi Fiberglass Co., Ltd.) in an amount of 40 wt % based on the total weight and fine zinc oxide powder (No. 1 zinc white conforming to JIS prepared by wet process) as used in Example 1 in an amount of 10 wt % based on the total weight. The components were mixed using a supermixer to prepare the composition (No. 22) of this invention.

For comparison, a composition (No. 23) was prepared by incorporating the same PPS powder with the above-mentioned glass chopped fiber in an amount of 40 wt % based on the total weight.

These compounds were pelletized using a twin-screw vented extruder.

(2) Injection molding test

The two kinds of pellets prepared in the above step (1) were formed into 20,000 pieces of 3-mm thick dumbbell specimens using an injection molder, Model N-140 buit by The Japan Steel Works, Ltd., under the following conditions. The inside of the mold was inspected for corrosion with naked eyes and using a magnifier.

Molding conditions:
  Mold material: SK entirely hardened (HRC 55)
  Cylinder temperature: 310° C.
  Injection pressure: 1000 kg/cm²
  Mold temperature: 120° C.
  Molding cycle time: 15 sec.

In this test, corrosion was observed in the mold used for the conventional composition (No. 23), whereas no corrosion was observed in the mold used for the composition of this invention (No. 22).

What is claimed is:

1. A biaxially oriented poly-p-phenylene sulfide film prepared from a resin composition comprising poly-p-phenylene sulfide as a principal component and 0.05 to 40 wt % based on the total weight of the composition of at least one component selected from the group consisting of fine zinc oxide particles and fine lead oxide particles, wherein particles not larger than one micron in diameter account for at least 10% of the total number of particles, and wherein the tensile strength of said film is not lower than 13 kg/mm² and not higher than 30 kg/mm² in both the longitudinal direction and the transverse direction.

2. A biaxially oriented poly-p-phenylene sulfide film as claimed in claim 1, wherein the poly-p-phenylene sulfide is composed of at least 95 mol % of recurring units represented by the structural formula

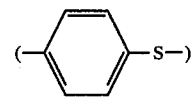

and the apparent melt viscosity of said poly-p-phenylene sulfide is in the range from 500 to 30,000 poise when measured at a temperature of 300° C. and a shear rate of 200 sec⁻¹.

3. A biaxially oriented poly-p-phenylene sulfide film as claimed in claim 1, wherein the stretching ratio is 2.0:1 to 4.5:1 in both the longitudinal direction and the transverse direction.

* * * * *